US012566462B2

(12) United States Patent
Schmitz et al.

(10) Patent No.: US 12,566,462 B2
(45) Date of Patent: Mar. 3, 2026

(54) PRESSURE REGULATOR FOR COMPRESSED GAS WITH ADJUSTABLE GAS PRESSURE SENSING ASSEMBLY

(71) Applicant: ROTAREX S.A., Lintgen (LU)

(72) Inventors: Philippe Schmitz, Steinsel (LU); Stephan Sellen, Wehingen (DE); Etienne Kaichinger, Kemplich (FR)

(73) Assignee: ROTAREX S.A., Lintgen (LU)

( * ) Notice: Subject to any disclaimer, the term of this patent is extended or adjusted under 35 U.S.C. 154(b) by 50 days.

(21) Appl. No.: 18/713,780

(22) PCT Filed: Nov. 25, 2022

(86) PCT No.: PCT/EP2022/083277
§ 371 (c)(1),
(2) Date: May 28, 2024

(87) PCT Pub. No.: WO2023/094591
PCT Pub. Date: Jun. 1, 2023

(65) Prior Publication Data
US 2025/0028339 A1      Jan. 23, 2025

(30) Foreign Application Priority Data
Nov. 25, 2021      (LU) ........................................ 500908

(51) Int. Cl.
*G05D 16/06*      (2006.01)
(52) U.S. Cl.
CPC .. *G05D 16/0619* (2013.01); *F17C 2205/0338* (2013.01); *Y10T 137/7826* (2015.04)
(58) Field of Classification Search
CPC ......... F17C 2205/0338; Y10T 137/906; Y10T 137/7826; Y10T 137/7821; G05D 16/0619
See application file for complete search history.

(56) References Cited

U.S. PATENT DOCUMENTS

| | | | | |
|---|---|---|---|---|
| 2,047,101 A | * | 7/1936 | Grove .................. | G05D 16/163 |
| | | | | 137/881 |
| 2,202,313 A | * | 5/1940 | Grove ................ | G05D 16/0655 |
| | | | | 137/505.42 |

(Continued)

FOREIGN PATENT DOCUMENTS

| | | |
|---|---|---|
| EP | 0420603 A2 | 4/1991 |
| EP | 3636971 A1 | 4/2020 |

OTHER PUBLICATIONS

International Search Report to corresponding PCT/EP2022/083277 mailed on Mar. 7, 2023.

(Continued)

*Primary Examiner* — Robert K Arundale
(74) *Attorney, Agent, or Firm* — Sandberg Phoenix & von Gontard, P.C.

(57)      ABSTRACT

A pressure regulator for compressed gas, comprising a body with a gas inlet, a gas outlet and a gas passage interconnecting said gas inlet with said gas outlet; a shut-off device comprising a seat located in the gas passage; a shutter configured for cooperating the seat; a pressure sensing assembly defining an internal volume filled with an auxiliary gas and closed by a plug, said pressure sensing assembly being elastically deformable and located in the gas passage downstream of the seat, said pressure sensing assembly being configured for actuating the shutter relative to the seat depending on a gas pressure downstream of the seat; a port fluidly connected, via the plug, to the internal volume, and configured for fluidly connecting an external source of the auxiliary gas to said internal volume for adjusting a pressure of the auxiliary gas in said internal volume.

20 Claims, 3 Drawing Sheets

(56)          References Cited

U.S. PATENT DOCUMENTS

| | | | | |
|---|---|---|---|---|
| 2,261,364 | A * | 11/1941 | Grove ................ | G05D 16/0655 |
| | | | | 137/341 |
| 2,320,886 | A * | 6/1943 | Francisco .......... | G05D 16/0647 |
| | | | | 137/505.2 |
| 2,469,038 | A * | 5/1949 | Winkler ............. | G05D 16/0619 |
| | | | | 92/143 |
| 5,033,505 | A * | 7/1991 | Eidsmore .............. | F16K 31/086 |
| | | | | 137/906 |
| 11,892,860 | B1 * | 2/2024 | Eidsmore .......... | G05D 16/0622 |
| 2019/0339726 | A1 | 11/2019 | Jones | |

OTHER PUBLICATIONS

Written Opinion to corresponding PCT/EP2022/083277 mailed on
Mar. 7, 2023.

* cited by examiner

PRESSURE REGULATOR FOR COMPRESSED GAS WITH ADJUSTABLE GAS PRESSURE SENSING ASSEMBLY

CROSS-REFERENCE TO RELATED APPLICATIONS

The present invention is the US national stage under 35 U.S.C. § 371 of International Application No. PCT/EP2022/083277 filed on Nov. 25, 2022, which claims the priority of application LU500908 filed on Nov. 25, 2021, the contents of which (text, drawings and claims) are incorporated here by reference in its entirety.

FIELD

The invention is directed to the field for pressure reduction and/or regulation of compressed gas, like industrial gases compressed at more than 150 bar in gas cylinders.

BACKGROUND

Prior art patent document published US 2019/0339726 A1 discloses a pressure regulator device for compressed gas, comprising a pressure-sensing assembly, or regulator, defining an internal volume filled with an auxiliary gas and closed by a plug, said pressure sensing assembly being elastically deformable and located in the gas passage downstream of a seat and actuating a shutter cooperating with a seat for regulating the gas pressure. The pressure-sensing assembly comprises a series of bellows formed by a series of annular members or diaphragms that are alternately secured at radially inner and outer regions (in double weld fashion) to define an accordion-like arrangement. The internal volume is presumably sealed by the plug but how the gas pressure inside that internal volume is set is not detailed. The use of such a pressure-sensing assembly forming a sealed internal volume filled with gas is interesting in that the resulting regulation of the gas pressure is independent of the ambient or atmospheric pressure. This is particularly interesting for applications where the pressure regulator is located inside the gas cylinder where there is no access to the ambient. The adjustment and control of the stiffness of the pressure-sensing assembly or pressure sensing assembly is however challenging.

SUMMARY

The invention has for technical problem to overcome at least one of the drawbacks of the above-mentioned prior art. More specifically, the invention has for technical problem to provide a pressure regulator for compressed gas that is reliable and can be easily adjusted and/or calibrated.

The invention is directed to a pressure regulator for compressed gas, comprising: a body with a gas inlet, a gas outlet and a gas passage interconnecting said gas inlet with said gas outlet; a shut-off device comprising: a seat located in the gas passage; a shutter configured for cooperating the seat; a pressure sensing assembly defining an internal volume filled with an auxiliary gas and closed by a plug, said pressure sensing assembly being elastically deformable and located in the gas passage downstream of the seat, said pressure sensing assembly being configured for actuating the shutter relative to the seat depending on a gas pressure downstream of the seat; wherein the pressure regulator further comprises a port fluidly connected, via the plug, to the internal volume of the pressure sensing assembly, and configured for fluidly connecting an external source of the auxiliary gas to said internal volume for adjusting a pressure of the auxiliary gas in said internal volume. The port is a connecting port.

According to an exemplary embodiment, the port is external to the pressure regulator.

According to an exemplary embodiment, the port shows a main axis that is transversal to a longitudinal axis of the pressure regulator.

Advantageously, the port shows a main axis that is radial relative to a longitudinal axis of the pressure regulator.

Advantageously, the port opens outs at an external surface of the body, said external surface being in various instances cylindrical.

The capacity of port to be fluidly connect an external source of the auxiliary gas to said internal volume of the pressure sensing assembly can be achieved by a contact surface on the body, through which the port opens out, said contact surface can, for example, be planar and circular, or a portion of cylinder, allowing a gas tight contact with the external source of the auxiliary gas.

According to an exemplary embodiment, the plug comprises a threaded portion engaging with a fixed portion of the pressure sensing assembly, and a conical needle portion engaging with an auxiliary seat formed in said fixed portion.

According to an exemplary embodiment, the plug is entirely located in the fluid connection between the port and the internal volume of the pressure sensing assembly.

According to an exemplary embodiment, the plug comprises an internal passage for the auxiliary gas between the threaded portion and the conical needle portion.

According to an exemplary embodiment, the plug comprises, at an end opposed to the internal volume of the pressure sensing assembly, an engagement surface for engaging with a tool by insertion of said tool into the port.

According to an exemplary embodiment, the engagement surface of the plug shows an insertion direction for the tool that is aligned with the port.

According to an exemplary embodiment, the engagement surface of the plug is configured such that the engagement with the tool is in rotation so that rotation of the tool rotates the plug.

According to an exemplary embodiment, the plug comprises a conical pin axially press fitted into an auxiliary seat formed in a fixed portion of the pressure sensing assembly, said conical pin having an outer smooth surface free of thread.

According to an exemplary embodiment, the plug further comprises a weld plug welded to the fixed portion of the pressure sensing assembly and fluidly located between the conical pin and the port.

According to an exemplary embodiment, the pressure sensing assembly comprises a fixed portion, a movable portion and at least one flexible wall attached to said fixed portion and said movable portion in a gas-tight fashion, the internal volume of the pressure sensing assembly being delimited by said at least one flexible wall, said fixed portion and said movable portion.

According to an exemplary embodiment, the shutter is mechanically linked, in various instances fixed, to the movable portion of the pressure sensing assembly.

According to an exemplary embodiment, the at least one flexible wall is circular, bellow-shaped and metallic.

According to an exemplary embodiment, the fixed portion of the pressure sensing assembly is rigidly attached to, or is part of the body.

According to an exemplary embodiment, the shutter comprises a poppet on an upstream side of the seat and a stem extending from the poppet through the seat until the pressure sensing assembly.

According to an exemplary embodiment, the stem of the shutter is attached to the movable portion of the pressure sensing assembly.

According to an exemplary embodiment, the port is located on cylindrical outer surface of the body, said cylindrical outer surface being able to engage in a gas-tight fashion with an adjustment tool.

According to an exemplary embodiment, the body comprises at the gas inlet and/or at the gas outlet, respectively, a connector in various instances with a face seal and a rotatable nut.

According to an exemplary embodiment, the body comprises at the gas outlet a male-threaded portion configured for engaging with a neck of a gas cylinder.

The invention can also be directed to a pressure sensing assembly, for a pressure regulator for compressed gas, defining an internal volume filled with an auxiliary gas and closed by a plug, said pressure sensing assembly being elastically deformable and configured for actuating a shutter relative to a seat depending on a gas pressure downstream of the seat; wherein the pressure sensing assembly further comprises a port fluidly connected, via the plug, to the internal volume, wherein the plug comprises a conical pin axially press fitted into an auxiliary seat formed in a fixed portion of the pressure sensing assembly, said conical pin having an outer smooth surface free of thread.

According to an exemplary embodiment, the port is a connecting port.

According to an exemplary embodiment, the plug further comprises a weld plug welded to the fixed portion of the pressure sensing assembly and fluidly located between the conical pin and the port.

According to an exemplary embodiment, the conical pin has a maximal outer diameter of less than 2 mm.

According to an exemplary embodiment, the pressure sensing assembly comprises a fixed portion, a movable portion and at least one flexible wall attached to said fixed portion and said movable portion in a gas-tight fashion, the internal volume of the pressure sensing assembly being delimited by said at least one flexible wall, said fixed portion and said movable portion.

According to an exemplary embodiment, the at least one flexible wall is circular, bellow-shaped and metallic.

According to an exemplary embodiment, the port is configured for fluidly connecting an external source of the auxiliary gas to said internal volume for adjusting a pressure of the auxiliary gas in said internal volume.

The invention is particularly interesting in that it provides a reliable and easy to adjust and control pressure regulator.

DRAWINGS

DETAILED DESCRIPTION

Figure 1:
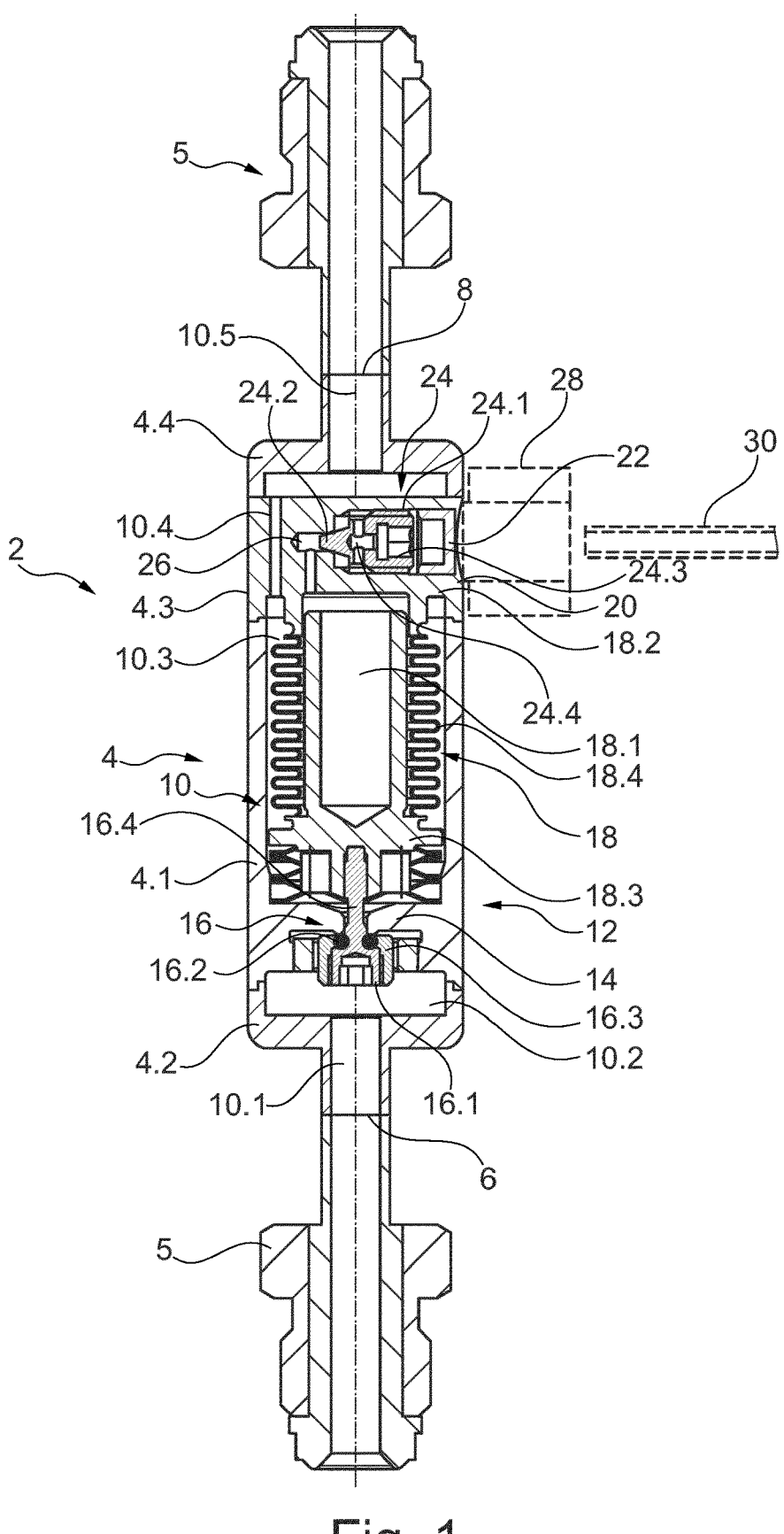
FIG. 1 is a sectional view of a pressure regulator according to a first embodiment of the invention.

FIG. 1 is a sectional view of an in-line pressure regulator according to a first embodiment of the invention.

The pressure regulator 2 comprises a body 4 which is for instance constituted of a first body part 4.1, a second body part 4.2 attached at one end of the first body part 4.1, a third body part 4.3 attached at an opposed end of the first body part 4.1, and a fourth body part 4.4 attached to the third body part 4.3, at an end thereof opposed to the first body part 4.1. It is however understood that the body 4 can be constituted of less or more than four body parts as in this specific example. The first, second, third and fourth body parts 4.1 4.2, 4.3 and 4.4 are attached to each other by welding being understood that other attaching means like screwing or clamping can be considered. On the body 4 are formed a gas inlet 6, a gas outlet 8 and a gas passage 10 fluidly interconnecting the gas inlet 6 with the gas outlet 8.

For instance, the second body part 4.2 comprises a tubular port forming the gas inlet 6 and to which a connector 5 is attached. The connector is for instance of the face seal type with a freely rotatably nut, commonly commercially available. The connector 5 comprises a tubular port which is instance attached by welding to the tubular port of the second body portion 4.2. A first portion 10.1 of the gas passage 10 extends longitudinally through the tubular port of the second body part 4.2. The first body part 4.1 comprises a bore-shaped cavity housing a shut-off device 12 and forming a second portion 10.2 and a third portion 10.3 of the gas passage 10.

The third body part 4.3 is arranged next the first body part 4.1, opposite to the second body part 4.2 and the gas inlet 6. A fourth portion 10.4 of the gas passage 10, directly downstream of the third portion 10.3 thereof, is formed in that third body part 4.3. The fourth body part 4.4 is attached to the third body part 4.3 and comprises a tubular port forming the gas outlet 8 and to which a connector 5 is attached. The connector is for instance of the face seal type with a freely rotatably nut, commonly commercially available. The connector 5 comprises a tubular port which is instance attached by welding to the tubular port of the fourth body portion 4.4.

The shut-off device 12 is located in the gas passage 10. The shut-off device 12 comprises a seat 14, a shutter 16 cooperating with the seat 14, and a pressure sensing assembly, or regulator, 18 defining an internal volume 18.1 filled with an auxiliary gas and closed by a plug 24, said pressure sensing assembly 18 being elastically deformable and located in the gas passage 10 downstream of the seat 14, said pressure sensing assembly 18 being configured for actuating the shutter 16 relative to the seat 14 depending on a gas pressure downstream of the seat.

The shutter 16 comprises for instance a poppet 16.1 located on an upstream side of the seat 14 and configured for cooperating with that side of the seat 14. In the present case, a gasket 16.2, e.g., an O-ring, is fitted around the poppet 16.1 and held against said poppet 16.1 by a sleeve 16.3 engaging with the poppet 16.1, e.g., by screwing. The gasket 16.2 is configured for contacting the seat 14 in a gas tight-fashion. It is understood that the gasket is optional, depending on the material of the seat and of the poppet. Also, the gasket can be provided on the seat. The shutter 16 further comprises a stem 16.4 extending longitudinally from the poppet 16.1 to the pressure sensing assembly 18 through the seat 14. For instance, the stem 16.4 shows a free end with a male-thread engaging with a corresponding female thread on the pressure sensing assembly 18. It is understood that another fixation means between the stem and the pressure sensing assembly can be considered.

As is apparent, the seat 14 is formed on a disk-shaped part that is formed in the body 4, for instance the first body part 4.1. It is however understood that other constructions can be considered. As a matter of example, the seat can be attached to the body 4 or first body part 4.1.

The pressure sensing assembly 18 comprises a fixed portion 18.2, a movable portion 18.3 and a flexible wall 18.4 attached in a gas-tight fashion to both fixed portion 18.2 and movable portion 18.3. The flexible wall 18.4 is in various instances metallic and attached to both the fixed portion 18.2 and the movable portion 18.3 by welding. The flexible wall 18.4 is generally circular and shows a bellows-shaped or accordion-shaped profile. The internal volume 18.1 is delimited by the flexible wall 18.4, the fixed portion 18.2 and the movable portion 18.3 of the pressure sensing assembly 18.

The fixed portion 18.2 of the pressure sensing assembly 18 is for instance formed on the third body part 4.3 being however understood that the fixed portion of the pressure sensing assembly can be distinct form the body of the pressure regulator 2, or at least be distinct from the body part that comprises the gas outlet 8.

The pressure sensing assembly 18 is elastically deformable in the longitudinal direction in that the movable portion 18.3 can move in that direction relative to the fixed portion 18.2 against the elastic deformation force of the flexible wall 18.4 in addition to the compression force of the auxiliary gas contained in the internal volume 18.1. It follows that the stiffness in compression of the pressure sensing assembly is directly dependent on the auxiliary gas pressure in said internal volume 18.1.

In operation, the compressed gas flows through the gas inlet 6, the first portion 10.1 and the second portion 10.2 of the gas passage 10 until the shut-off device 12. It then flows between the reduced cross-section between the shutter 16 and the seat 14 and is thereby laminated and reduced in pressure when reaching the regulation chamber formed by the third portion 10.3 of the gas passage 10 and containing the pressure sensing assembly 18. The reduced pressure on the pressure sensing assembly 18 urges the movable portion 18.3 towards the fixed portion 18.2, against the combined resilient force of the flexible wall and the pressure of the auxiliary gas contained in the internal volume 18.1. Upon such a compression movement of the pressure sensing assembly 18, the movable portion 18.3 moves the shutter 16 upwardly closer to the seat 14 and thereby reduces the cross-section therebetween, leading to a more intense gas lamination and reduction in pressure. This mechanism provides a controlled pressure regulation of the compressed gas contained in the gas cylinder. The principle of such a pressure regulation is as such well-known from the skilled person and does not need to be further detailed.

The internal volume 18.1 of the pressure sensing assembly 18, filled with the auxiliary gas, is closed by the plug 24 that is in fluid connection with a port 20 configured for fluidly connecting an external source 28 of the auxiliary gas to the internal volume 18.1 for adjusting a pressure of the auxiliary gas in the internal volume.

The plug 24 and the port 20 are configured for allowing, via the external source 28 of the auxiliary gas and a tool 30 for operating the plug 24, to adjust and control the auxiliary gas pressure in the internal volume 18.1. Upon opening of the fluid connection 26 by operating the plug 24 via engagement of the tool 30 with the plug 24, the external source 28 of auxiliary gas can adjust the pressure of said gas and once a desired pressure is achieved, the plug 24 can be operated for closing the fluid connection 26 and thereby closing the internal volume 18.1.

A protective cap 22 can be placed on the port 20 so as to close it with regard to dust. It can be mode of plastic or any other material, in various instances softer than the material of the body.

For instance, the plug 24 is entirely located in the fluid connection 26 between the internal volume 18.1 of the pressure sensing assembly 18 and the port 20. This means that during pressure adjustment by means of the external source 28 of auxiliary gas and of the tool 30, the latter 30 will be in contact with the auxiliary gas during adjustment and needs therefore to be in gas-tight connection relative to the auxiliary gas passage 28.1 of the external source 28 in fluid connection with the port 20. Such a rotating gas-tight connection between the tool 30 and a body of the external source 28 can be achieved using one or more gaskets or seals mounted around a cylindrical surface portion of the tool and allowing a combined translational and rotation movement of said tool while providing gas-tight sealing.

The plug 24 comprises an outer threaded portion 24.1 engaging with a corresponding inner thread formed in the fluid connection 26, and a needle portion 24.2 that is advantageously conical and that is configured to engage in a gas-tight fashion with an auxiliary seat formed in the fluid connection 26 between the internal volume 18.1 and the port 20. The plug 24 further comprises at an end opposed to the needle portion 24.2, an engagement surface 24.3 for engaging with a tool 30 by insertion of said tool into the port 20. The plug 24 can further comprise an internal passage 24.4 for the auxiliary gas between the threaded portion 24.1 and the conical needle portion 24.2.

Alternatively, the plug 24 can be only partly located in the fluid connection 26 between the internal volume 18.1 of the pressure sensing assembly 18 and the port 20. More specifically, the engagement surface 24.3 can be fluidly located outside of the fluid connection 26, whereby the plug 24 can be in a gas-tight sealed connection with the fixed portion 18.2 or third body part 4.3 forming said fluid connection 26. In such a configuration, the tool 30 does not need to be in gas-tight connection with the body of the external source 28 of auxiliary gas.

The above-described pressure regulator with the shutter comprising a poppet on the high-pressure side of the seat, i.e., on the upstream side thereof, can be normally closed, i.e., closed when the gas pressure at the gas outlet is at the atmospheric pressure. In that case, the pressure regulator can function as a sub-atmospheric pressure regulator that opens when the pressure at the outlet is below the atmospheric pressure, i.e., some level of vacuum. In such a situation, the gas pressure in the chamber formed by the third portion 10.3 of the gas passage 10 is reduced from the atmospheric pressure, thereby reducing the resulting compressive force acting on the pressure sensing assembly 18. The latter will then expand by moving the movable portion 18.3 away form the first portion 18.2 until the auxiliary gas pressure in the internal volume, in combination with the resilient force of the flexible wall, equilibrates with the reduced pressure in said chamber.

Alternatively, the above-described pressure regulator can be normally opened, i.e., opened in the absence of pressure at the inlet in order to allow gas to flow until a pressure threshold in the chamber 10.3 is reached above which the shut-off device closes. In such a configuration, a manual shut-off valve can be foreseen upstream and/or downstream of the shut-off device 12.

Contrary to the above configuration where the shutter comprises a poppet on the high-pressure side of the seat, the shutter can be exclusively located on the low-pressure or downstream side of the seat. In such a case, the pressure sensing assembly needs to be inverted so that the gas pressure in the chamber 10.3 compresses the pressure sensing assembly 18 towards the seat and moves the shutter towards the seat so as to reduce the cross-section therebetween.

A filter, e.g., of the fritted type, can be placed in the first portion 10.1 of gas passage, i.e., upstream of the shut-off device 12. Similarly, a filter, also possibly of the fritted type, can be placed in the fifth portion 10.51 of gas passage, i.e., downstream of the shut-off device 12.

The above-described pressure regulator is particularly advantageous in that its pressure sensing assembly can be easily controlled and adjusted, not only in static conditions, i.e., in the absence of gas flow but also in dynamic conditions, i.e., when a flow of gas is outputted.

Figure 2:
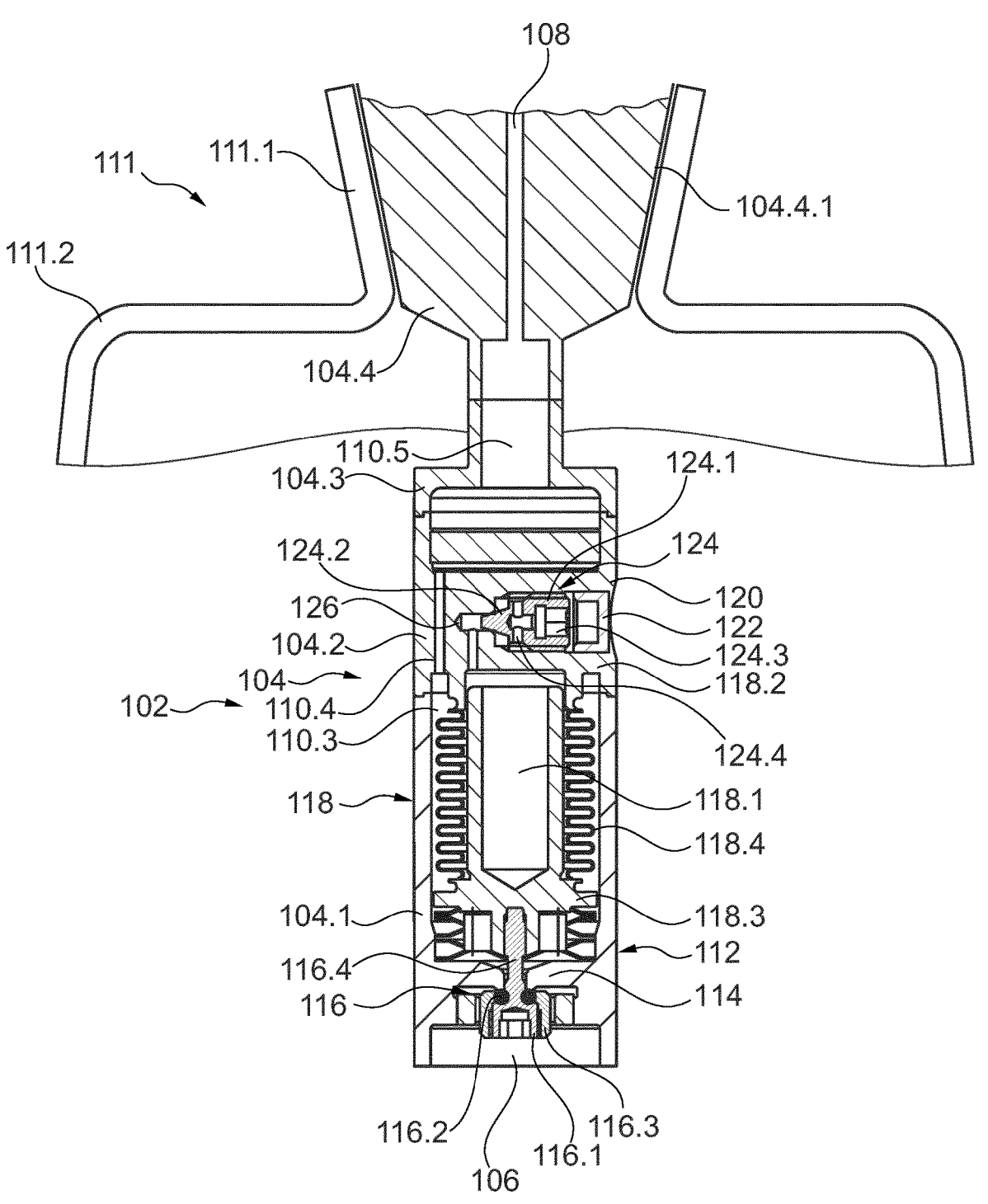
FIG. 2 is a sectional view of a pressure regulator according to a second embodiment of the invention.

FIG. 2 is a sectional view of a pressure regulator according to a second embodiment of the invention. The reference numbers of the first embodiment in FIG. 1 are used for designating the same or corresponding elements of the second embodiment in FIG. 2, these numbers being however incremented by 100. It is referred to the description of these elements in connection with the first embodiment. Specific reference number(s) comprised between 100 and 200 is/are used for designating specific element(s).

The pressure regulator 102 in FIG. 2 differs from the in-line pressure regulator in FIG. 1 essentially in that it is located in inside a gas cylinder 111. To that end, the construction of the body 104 is different in that the second body part with the tubular port at the gas inlet 106 is not provided. The body 104 comprises a second body part 104.2 corresponding to the third body part 4.3 of the first embodiment, and a third body part 104.3 adjacent the second body part 104.2 and corresponding to the fourth body part 4.4 of the first embodiment. The body 104 further comprises a fourth body part 104.4 adjacent the third body part 104.3, with a male-threaded portion 104.4.1 being provided on the fourth body part 104.4. The male-threaded portion 104.4.1 engages with an inner thread of the neck 111.1 of the gas cylinder 111. It is understood that the third and fourth body parts 104.3 and 104.4 can be unitary and also can be unitary with the second body part 104.2.

Apart from the change of position of the male-threaded portion on the body 104 of the pressure regulator 102, the construction and functions thereof are identical to those of the pressure regulator of the first embodiment.

Similarly to the first embodiment, it can comprise a filter at the gas inlet 106 and/or at the gas outlet 8. In the present embodiment, a filter is provided in the fifth portion 110.5 of the gas passage 110.

Figures 3, 4:
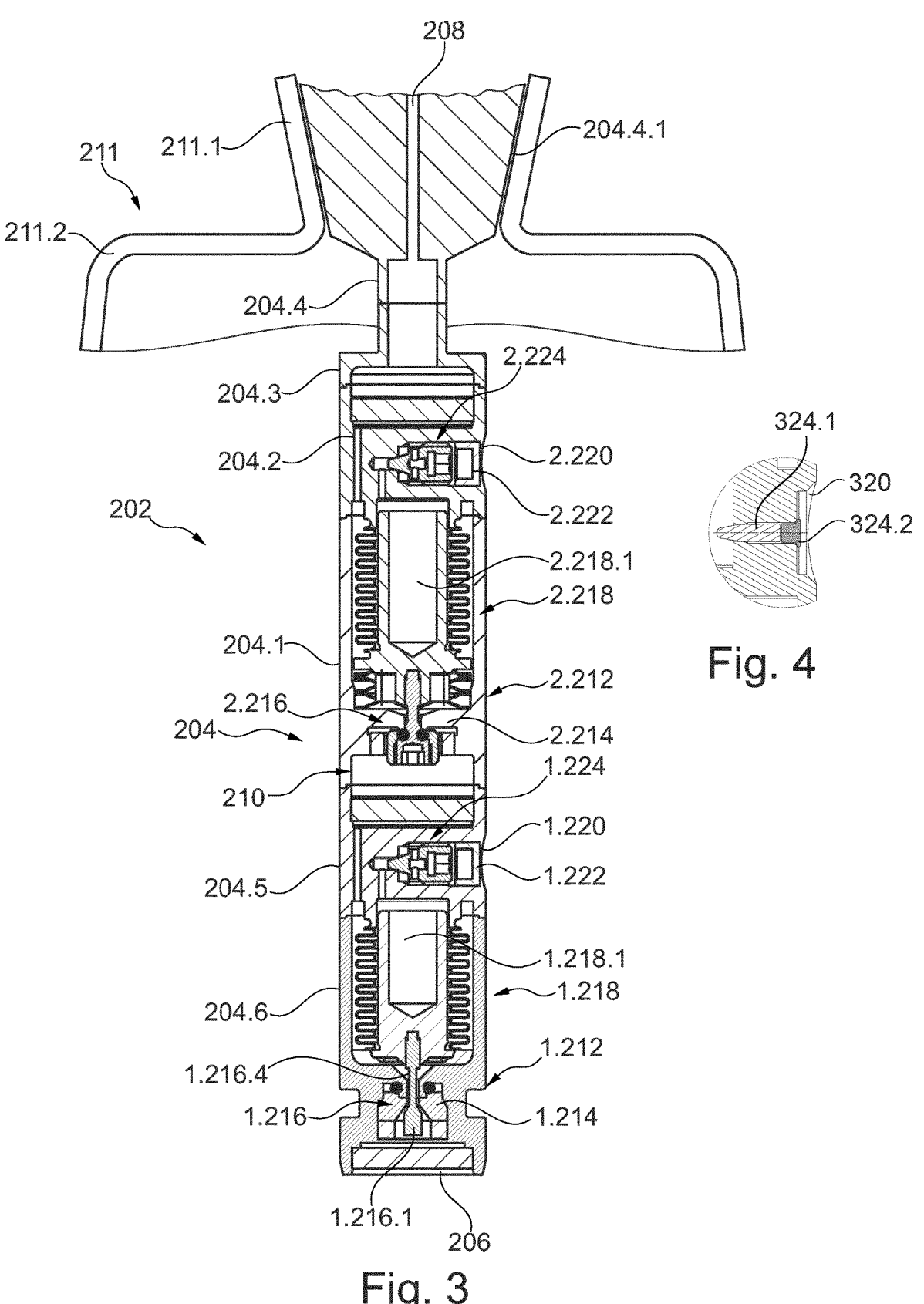
FIG. 3 is a sectional view of a pressure regulator according to a third embodiment of the invention.
FIG. 4 is a detail view of an alternative plug, according to a fourth embodiment of the invention.

FIG. 3 is a sectional view of a pressure regulator according to a third embodiment of the invention. The reference numbers of the second embodiment in FIG. 2 are used for designating the same or corresponding elements of the third embodiment in FIG. 3, these numbers being however incremented by 100. It is referred to the description of these elements in connection with the second embodiment and also, by reference, with the first embodiment.

The pressure regulator in FIG. 3 differs from the pressure regulator in FIG. 2 essentially in that it is a two-stage pressure regulator. The pressure regulator 202 comprises a first stage formed essentially by the first shut-off device 1.212 comprising the first pressure sensing assembly 1.218 and the first port 1.220, and a second stage formed essentially by the second shut-off device 2.212 comprising the second pressure sensing assembly 2.218 and the second port 2.220.

As this is apparent, the second shut-off device 2.212, including the second pressure sensing assembly 2.218 and the second port 2.220, is essentially identical to the shut-off device 112 of the pressure regulator 102 in FIG. 2.

The first shut-off device 1.212, including the first pressure sensing assembly 1.218 and the first port 1.220, is similar but not identical to the second shut-off device 2.212 and the shut-off device 121 of the pressure regulator 102 in FIG. 2. The functioning principle is however identical. The differences are essentially due to the difference in pressure values to be regulated.

The shutter 1.216 is different in that it does not comprise a gasket and a sleeve for holding said gasket as in second shut-off device 2.212, but rather solely comprises a poppet 1.216.1 and a stem 1.216.4. The seat 1.214 is formed by a washed made of non-metallic material that is press-fitted in a cavity of the body and gas-tight sealed therewith by a gasket, for instance an O-ring. The poppet 1.216 made of a harder material like a metallic material can cooperate in a gas-tight fashion with a seat 1.214 made of softer material like a non-metallic material. The first shut-off device 1.212 thereby provides a first-stage pressure reduction whereas the second shut-off device 2.212, arranged directly downstream of the first shut-off device 1.212, provides a second-stage pressure reduction.

The pressure-regulator 202 of the third embodiment can be set-up as a sub-atmospheric pressure regulator or not, similarly to the first and second embodiments.

A filter, for instance of the fritted type, is placed in the gas passage at the gas inlet 206. A further filter, also in various instances of the fritted type, is placed in the gas passage between the two stages. A still further filter, also in various instances of the fritted type, is placed in the gas passage downstream of the second stage of the pressure regulator and upstream of the gas outlet 208.

FIG. 4 is a detail sectional view of the port portion of an in-line pressure regulator, according to a fourth embodiment of the invention.

The reference numbers of the first embodiment in FIG. 1 are used for designating the same or corresponding elements of the fourth embodiment in FIG. 4, these numbers being however incremented by 300.

The plug 324, instead of comprising an outer threaded portion engaging with a corresponding inner thread formed in the fluid connection, is a conical pin 324.1 that is axially inserted or press-fitted into an auxiliary seat formed in the fluid connection. The conical pin 324.1 shows an outer lateral surface that is smooth along its all extent. It is intended to be inserted by a tool integrated in an external source of auxiliary gas, like the one 28 in FIG. 1. The advantage of this conical pin 324.1 is that it can be more easily put in place than the threaded plug 24 which is likely to grip by forming metallurgical bonds at the thread, in particular in the absence of mounting grease. This is particularly true when the parts in play are made of stainless steel. The use of grease is indeed to be avoided in many applications, in particular when the pressure regulator is to be in contact with aggressive gases.

The plug 324 can further comprise a weld plug 324.2 which is inserted in the fluid connection between the internal volume and the port 320, fluidly between the conical pin 324.1 and the port 320. That weld plug is made of metal, in various instances of the same metal as the fixed portion of the pressure sensing assembly. It can then be welded to the fixed portion, in various instances without any filler material, the weld plug playing basically the role of filler material during welding. The welding can be made by TIG method (Tungsten Inert Gas) or the like.

After adjustment of the pressure of the auxiliary gas in the internal volume, using an external source of auxiliary gas, the conical pin 324.1 can be inserted, using a tool integrated with the external source of auxiliary gas, thereby providing a gas tight barrier. The conical pin 324.1 can be provided with grease which is as such not incompatible with the auxiliary gas being for example Helium. Thereafter, the weld plug 324.2 is put in place and welded. It forms then a second and secure gas tight barrier that additionally prevents any contact of the ambient gas, being for example aggressive semi-conductor gases, with the grease that can be provided on the conical pin 324.1.

This fourth embodiment providing an alternative plug is applicable to any of the first, second and third embodiments.

The invention claimed is:

1. A pressure regulator for compressed gas, said regulator comprising:
   a body with a gas inlet, a gas outlet and a gas passage interconnecting the gas inlet with the gas outlet;
   a shut-off device comprising:
   a seat located in the gas passage;
   a shutter configured for cooperating the seat;
   a pressure sensing assembly defining an internal volume filled with an auxiliary gas and closed by a plug, the pressure sensing assembly being elastically deformable and located in the gas passage downstream of the seat, the pressure sensing assembly being configured for actuating the shutter relative to the seat depending on a gas pressure downstream of the seat; and
   a port fluidly connected, via the plug, to the internal volume of the pressure sensing assembly, and configured for fluidly connecting an external source of the auxiliary gas to the internal volume for adjusting a pressure of the auxiliary gas in the internal volume;
   wherein the pressure sensing assembly comprises a fixed portion, a movable portion and at least one flexible wall attached to the fixed portion and the movable portion in a gas-tight fashion, the internal volume of the pressure sensing assembly being directly delimited by the at least one flexible wall, the fixed portion and the movable portion.

2. The pressure regulator according to claim 1, wherein the port is external to the pressure regulator.

3. The pressure regulator according to claim 1, wherein the port shows a main axis that is transversal to a longitudinal axis of the pressure regulator.

4. The pressure regulator according to claim 1, wherein the plug comprises a threaded portion engaging with a fixed portion of the pressure sensing assembly, and a conical needle portion engaging with an auxiliary seat formed in the fixed portion.

5. The pressure regulator according to claim 1, wherein the plug is entirely located in the fluid connection between the port and the internal volume of the pressure sensing assembly.

6. The pressure regulator according to claim 4, wherein the plug comprises an internal passage for the auxiliary gas between the threaded portion and the conical needle portion.

7. The pressure regulator according to claim 5, wherein the plug comprises, at an end opposed to the internal volume of the pressure sensing assembly, an engagement surface for engaging with a tool by insertion of the tool into the port.

8. The pressure regulator according to claim 7, wherein the engagement surface of the plug shows an insertion direction for the tool that is aligned with the port.

9. The pressure regulator according to claim 7, wherein the engagement surface of the plug is configured such that the engagement with the tool is in rotation so that rotation of the tool rotates the plug.

10. The pressure regulator according to claim 1, wherein the shutter is mechanically linked to the movable portion of the pressure sensing assembly.

11. The pressure regulator according to claim 1, wherein the at least one flexible wall is circular, bellow-shaped and metallic.

12. The pressure regulator according to claim 1, wherein the fixed portion of the pressure sensing assembly is rigidly attached to, or is part of the body.

13. The pressure regulator according to claim 1, wherein the shutter comprises a poppet on an upstream side of the seat and a stem extending from the poppet through the seat until the pressure sensing assembly.

14. The pressure regulator according to claim 13, wherein the stem of the shutter is attached to the movable portion of the pressure sensing assembly.

15. The pressure regulator according to claim 1, wherein the port is located on cylindrical outer surface of the body, the cylindrical outer surface being able to engage in a gas-tight fashion with a source of auxiliary gas.

16. The pressure regulator according to claim 1, wherein the body comprises at the gas inlet and/or at the gas outlet a connector with a face seal and a rotatable nut.

17. The pressure regulator according to claim 1, wherein the body comprises at the gas outlet a male-threaded portion configured for engaging with a neck of a gas cylinder.

18. A pressure regulator for compressed gas, said regulator comprising:
   a body with a gas inlet, a gas outlet and a gas passage interconnecting the gas inlet with the gas outlet;
   a shut-off device comprising:
   a seat located in the gas passage;
   a shutter configured for cooperating the seat;
   a pressure sensing assembly defining an internal volume filled with an auxiliary gas and closed by a plug, the pressure sensing assembly being elastically deformable and located in the gas passage downstream of the seat, the pressure sensing assembly being configured for actuating the shutter relative to the seat depending on a gas pressure downstream of the seat; and
   a port fluidly connected, via the plug, to the internal volume of the pressure sensing assembly, and configured for fluidly connecting an external source of the auxiliary gas to the internal volume for adjusting a pressure of the auxiliary gas in the internal volume;
   wherein the plug comprises a threaded portion engaging with a fixed portion of the pressure sensing assembly, a conical needle portion engaging with an auxiliary seat formed in the fixed portion, and an internal passage for the auxiliary gas between the threaded portion and the conical needle portion.

19. A pressure regulator for compressed gas, said regulator comprising:
   a body with a gas inlet, a gas outlet and a gas passage interconnecting the gas inlet with the gas outlet;
   a shut-off device comprising:
   a seat located in the gas passage;
   a shutter configured for cooperating the seat;

a pressure sensing assembly defining an internal volume filled with an auxiliary gas and closed by a plug, the pressure sensing assembly being elastically deformable and located in the gas passage downstream of the seat, the pressure sensing assembly being configured for actuating the shutter relative to the seat depending on a gas pressure downstream of the seat; and a port fluidly connected, via the plug, to the internal volume of the pressure sensing assembly, and configured for fluidly connecting an external source of the auxiliary gas to the internal volume for adjusting a pressure of the auxiliary gas in the internal volume;

wherein the plug comprises a conical pin axially press fitted into an auxiliary seat formed in a fixed portion of the pressure sensing assembly, the conical pin having an outer smooth surface free of thread.

20. The pressure regulator according to claim 19, wherein the plug further comprises a weld plug welded to the fixed portion of the pressure sensing assembly and fluidly located between the conical pin and the port.

\* \* \* \* \*